United States Patent
Odry

(10) Patent No.: US 7,590,271 B2
(45) Date of Patent: Sep. 15, 2009

(54) SYSTEM AND METHOD FOR AUTOMATIC DETECTION AND LOCALIZATION OF 3D BUMPS IN MEDICAL IMAGES

(75) Inventor: Benjamin L. Odry, West New York, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 757 days.

(21) Appl. No.: 11/250,227

(22) Filed: Oct. 14, 2005

(65) Prior Publication Data

US 2006/0093196 A1 May 4, 2006

Related U.S. Application Data

(60) Provisional application No. 60/622,972, filed on Oct. 28, 2004.

(51) Int. Cl.
*G06K 9/00* (2006.01)
(52) U.S. Cl. ........................... 382/128; 382/131
(58) Field of Classification Search ......... 382/128–132, 382/168–173, 100, 154, 203, 286; 128/920–922; 600/425, 300; 601/2
See application file for complete search history.

(56) References Cited

U.S. PATENT DOCUMENTS

| | | | | |
|---|---|---|---|---|
| 6,331,116 | B1 * | 12/2001 | Kaufman et al. | 434/262 |
| 6,898,303 | B2 * | 5/2005 | Armato et al. | 382/131 |
| 7,058,210 | B2 * | 6/2006 | Mundy et al. | 382/128 |
| 7,412,084 | B2 * | 8/2008 | Jerebko | 382/128 |
| 7,480,401 | B2 * | 1/2009 | Shen et al. | 382/131 |
| 2002/0006216 | A1 * | 1/2002 | Armato et al. | 382/131 |
| 2003/0099391 | A1 * | 5/2003 | Bansal et al. | 382/131 |
| 2004/0184647 | A1 * | 9/2004 | Reeves et al. | 382/131 |
| 2005/0111720 | A1 * | 5/2005 | Gurcan et al. | 382/131 |
| 2006/0079761 | A1 * | 4/2006 | Tu et al. | 600/425 |
| 2007/0031019 | A1 * | 2/2007 | Lesage et al. | 382/131 |

* cited by examiner

*Primary Examiner*—Samir A. Ahmed
*Assistant Examiner*—Mehdi Rashidian

(57) ABSTRACT

A method of detecting irregularities in a digitized image includes selecting a volume of interest in an image, growing a surface from a point in said volume of interest, determining the local gradient of each point on said surface, and applying a local filter to said gradient, determining a histogram of filtered gradients, and detecting an irregularity by selecting those points corresponding to gradient histogram values above a threshold value.

20 Claims, 6 Drawing Sheets

SYSTEM AND METHOD FOR AUTOMATIC DETECTION AND LOCALIZATION OF 3D BUMPS IN MEDICAL IMAGES

CROSS REFERENCE TO RELATED UNITED STATES APPLICATIONS

This application claims priority from "Automatic detection of 3D bumps for accurate localization in application such as lung nodules, colon polyps detection/segmentation", U.S. Provisional Application No. 60/622,972 of Benjamin Odry, filed Oct. 28, 2004, the contents of which are incorporated herein by reference.

TECHNICAL FIELD

This invention is directed to the detection of irregularities in digitized medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

In medical imaging, most abnormalities are usually irregularities in a structure. The irregularity could be a lung nodule on a pleura wall, an aneurism attached to a vessel, or a polyp on a colon wall. The use of computed tomography ("CT") scanners is wide spread for lung cancer screening. CT scanning provides high-resolution datasets and potentially allows precise analysis and improved detection of such abnormalities. However, analyzing the datasets through 2D slices can be time consuming, and automated detection tools have been proven to be of help for physicians. Several tools, such as interactive nodule segmentation or nodule follow-up, which typically form part of a Computer Aided Diagnosis ("CAD") system, have already been implemented.

One challenge for segmenting lung nodules attached to the pleura is not to select the pleura voxels. Lung nodules can be segmented using interpolation of the surface, or using the 2D slices of the volumes of interest and computing curvatures to determine the location of the bumps. The inconveniences of 2D are that it is not always accurate and that the segmentation can vary from one slice to another.

SUMMARY OF THE INVENTION

Exemplary embodiments of the invention as described herein generally include methods and systems for localization of abnormalities on a surface, such as a pleura wall, that can be used as an initial step for detection and localization. Bumps are localized in 3D using local differences of the surface, leading to a more accurate segmentation or detection of the abnormalities along the pleura surface. In one exemplary embodiment of the invention, 3-dimensional information in the CT volume is used to locate bumps on a local surface. One exemplary surface is the lung pleura, but it is to be understood that algorithms according to an embodiment of the invention can be used to analyze colon surfaces for polyp detection, as well as vessel surfaces for aneurysm detection. Method according to an embodiment of the invention yield consist results since shape differences are used to locate bumps. In addition, knowledge based analysis could be performed to improve accuracy. A method according to an embodiment of the invention can serve as a first step for a nodule segmentation that achieves an average segmentation consistency rate of 90% when tested on 20 nodules.

According to an embodiment of the invention, there is provided a method for detecting irregularities in a digitized image comprising the steps of providing a digitized image comprising a plurality of intensities corresponding to a domain of points on an N-dimensional grid, selecting a volume of interest in said image, growing a surface from a point in said volume of interest, determining the local gradient of each point on said surface, and applying a local filter to said gradient, determining a histogram of filtered gradients, and detecting an irregularity by selecting those points corresponding to gradient histogram values above a threshold value.

According to a further aspect of the invention, the volume of interest is selected by a user.

According to a further aspect of the invention, the image is subdivided into a plurality of sub-volumes, wherein each sub-volume is a volume of interest.

According to a further aspect of the invention, the surface is grown based on an intensity constraint and a spatial constraint.

According to a further aspect of the invention, the intensity constraint comprises a threshold wherein points on said surface are selected, and said spatial constraint comprises at least one neighbor of said surface point is also a surface point.

According to a further aspect of the invention, the gradient is computed over a 3×3×3 neighborhood of each surface point, and wherein said filter comprises a 3×3×3 operator defined for each of three axes, and further comprising summing each of said three filters for each surface point.

According to a further aspect of the invention, the histogram relates each surface point to its filter sum for each of said three axes.

According to a further aspect of the invention, the histogram threshold value is determined by applying a Laplacian operator to analyze differences in said histogram values.

According to a further aspect of the invention, the filter comprises an X-axis operator on a plane perpendicular to a Z-axis, an Y-axis operator on a plane perpendicular to said Z-axis, and a Z-axis operator on a plane perpendicular to said Z-axis, wherein said X-axis operator takes the form

| −1 | 0 | 1 | −1 | 0 | 1 | −1 | 0 | 1 |
|----|---|---|----|---|---|----|---|---|
| −1 | 0 | 1 | −1 | 0 | 1 | −1 | 0 | 1 |
| −1 | 0 | 1 | −1 | 0 | 1 | −1 | 0 | 1 | said Y-axis operator takes the form

| 1 | 1 | 1 | 1 | 1 | 1 | 1 | 1 | 1 |
|---|---|---|---|---|---|---|---|---|
| 0 | 0 | 0 | 0 | 0 | 0 | 0 | 0 | 0 |
| −1 | −1 | −1 | −1 | −1 | −1 | −1 | −1 | −1 | and said Z—axis operator takes the form

| −1 | −1 | −1 | 0 | 0 | 0 | 1 | 1 | 1 |
|---|---|---|---|---|---|---|---|---|
| −1 | −1 | −1 | 0 | 0 | 0 | 1 | 1 | 1 |
| −1 | −1 | −1 | 0 | 0 | 0 | 1 | 1 | 1 |

According to another aspect of the invention, there is provided a program storage device readable by a computer, tangibly embodying a program of instructions executable by the computer to perform the method steps for detecting irregularities in a digitized image.

DETAILED DESCRIPTION OF THE PREFERRED EMBODIMENTS

Exemplary embodiments of the invention as described herein generally include systems and methods for detecting irregularities within a locally defined surface. A method according to an embodiment of the invention can detect bumps on a surface. In medical practice, bumps often correspond to abnormalities or pathologies and thus need to be detected and evaluated for diagnosis.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In an exemplary application described herein, 3D CT images of the lung are used, which are commonly generated for lung cancer screening, where the surface represents lung pleura. A method according to an embodiment of the invention evaluates the local smoothness of the surface and checks each surface point against this average smoothness. It can be determine whether there is an irregularity that could correspond to an abnormality or pathology. Artifacts can be eliminated depending on the relationship of pixel positions to the surface of interest. This selection of surface points that belong to a bump can also be a first step for further applications, such as segmentation of the abnormality, with a high level of consistency in the application result.

Although embodiments of the invention are described herein in terms of an exemplary CT lung images, it is to be understood that embodiments of the invention can be used for other applications, such as colon polyps and aneurisms, and images acquired through other modalities, such as MRI, PET, US, etc.

Figure 1:
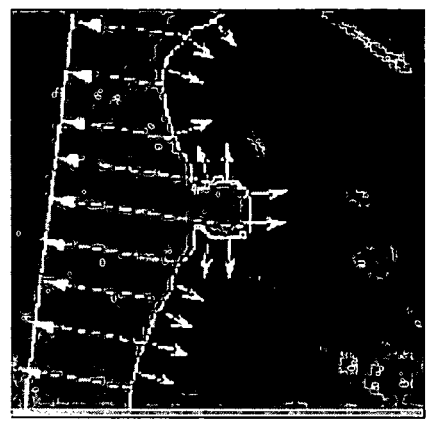
FIG. 1 illustrates an exemplary lung nodule attached to lung pleura, according to an embodiment of the invention.

FIG. 1 illustrates an exemplary lung nodule attached to lung pleura, according to an embodiment of the invention. The figure illustrates the surface normals of the pleura and the nodule. The nodule, outlined in gray, presents a different orientation from the surrounding walls, as indicated by the outward arrows. A detection method according to an embodiment of the invention can detect a nodule by determining these surface normals.

Figure 4:
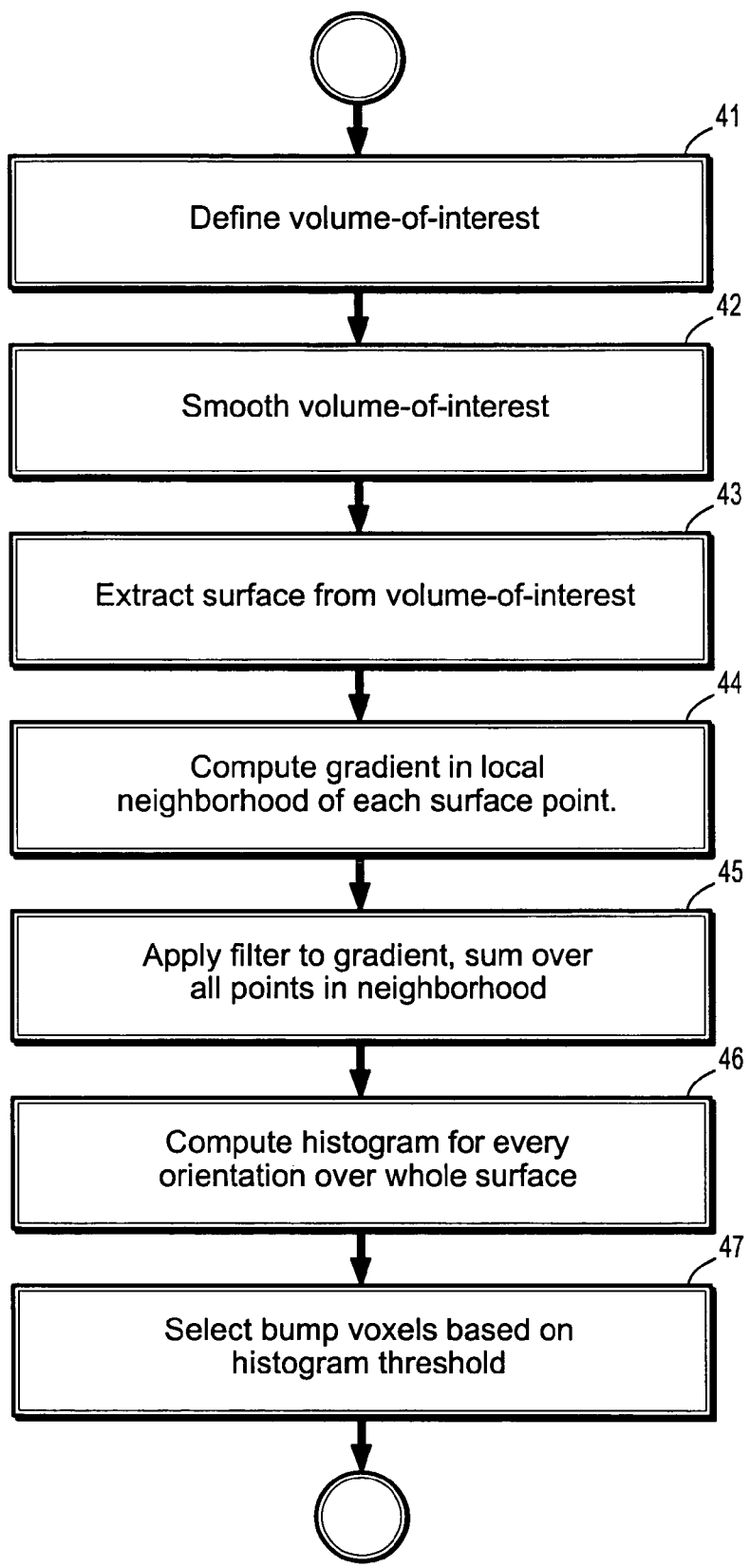
FIG. 4 depicts a flow chart of a 3D bump localizer, according to an embodiment of the invention.

A flow chart of a 3D bump localizer method, according to an embodiment of the invention, is depicted in FIG. 4. The method starts at step 41 by defining a volume of interest (VOI) along the pleura surface. For a lung nodule, a typical, non-limiting, volume of interest would be about 40×40×40 mm, which would correspond to an image sub-volume of about 50×50×50 voxels to about 70×70×70 voxels, at current imaging resolutions. Note that as imaging resolutions improve, this sub-volume would incorporate a larger number of voxels. Although in this exemplary case the VOI is user-defined with a click point, the pleura surface could also be divided into smaller volume blocks and the bump localizer technique could be applied to each block. At step 42, the VOI is smoothed to eliminate small structures around the surface. An exemplary smoothing technique uses a mathematical morphology operator, where a typical morphology operator utilizes a 3×3×3 voxel filter to perform the smoothing. Other smoothing techniques can be based on a statistical analysis of the voxel intensities surrounding a voxel of interest. At step 43, a surface points are extracted from the VOI. There are many surface extraction algorithms known in the art. According to one exemplary, non-limiting technique, surface points are computed using a region-growing procedure with an intensity constraint that imposes a threshold to select points that belong to the chest wall, and a spatial constraint where at least one of the 8-neighbors must inside of the lung itself. Other techniques known in the art include templates, snakes, and level sets.

Once the surface points are selected, a gradient is computed at step 44 on a local 3×3×3 neighborhood for each of the surface point. Three 3×3×3 filters are applied to each of the three gradients, each filter focusing on a specific gradient orientation, along the X, Y and Z axes. The format of the filters is as follows:

|    | Slice 1 |    |    | Slice 2 |    |    | Slice 3 |    |    |
|----|----|----|----|----|----|----|----|----|----|
| X: | −1 | 0 | 1 | −1 | 0 | 1 | −1 | 0 | 1 |
|    | −1 | 0 | 1 | −1 | 0 | 1 | −1 | 0 | 1 |
|    | −1 | 0 | 1 | −1 | 0 | 1 | −1 | 0 | 1 |
| Y: | 1 | 1 | 1 | 1 | 1 | 1 | 1 | 1 | 1 |
|    | 0 | 0 | 0 | 0 | 0 | 0 | 0 | 0 | 0 |
|    | −1 | −1 | −1 | −1 | −1 | −1 | −1 | −1 | −1 |
| Z: | −1 | −1 | −1 | 0 | 0 | 0 | 1 | 1 | 1 |
|    | −1 | −1 | −1 | 0 | 0 | 0 | 1 | 1 | 1 |
|    | −1 | −1 | −1 | 0 | 0 | 0 | 1 | 1 | 1 |

The top row of the above table depicts the filters along the X-axis, in a plane perpendicular to the Z-axis. The middle row of the table depicts the filters along the Y-axis, in a plane perpendicular to the Z-axis. The bottom row of the table depicts the filters along the Z-axis, in a plane perpendicular to the Z-axis. Filter formats along the X- and Y-axes are analogous. Note that the choice of orienting the filters about the Z-axis is exemplary, and filters defined in planes perpendicular to the X- and Y-axes are within the scope of an embodiment of the invention.

Referring again to FIG. 4, these three filters are applied at step 45 to each surface point, and the values of each filter are summed where the corresponding points on the volume belongs to the pleura wall. A range of values from −9 (9 times the value "−1") to +9 (9 times the value "+1") is obtained. This range corresponds to orientations along the X, Y Z axis that depends on the local neighborhood. As the surface is regular, most the points of the surface can be represented by the same range of X, Y, Z orientation values. For most points, that is, points on the pleura surface, the X-gradient will yield a filter sum of −9. However, a point on a nodule surface will typically have an X-gradient filter sum value of 0, with non-zero values for the Y- and Z-gradient filter sums. From this, a histogram is computed at step 46 for every orientation for the whole surface. At step 47, the bump (nodule in this case) voxels are selected based on a threshold of the histogram. The histogram threshold is found using Laplacian operator that looks for the differences of intensities in the histogram.

Figure 2A:
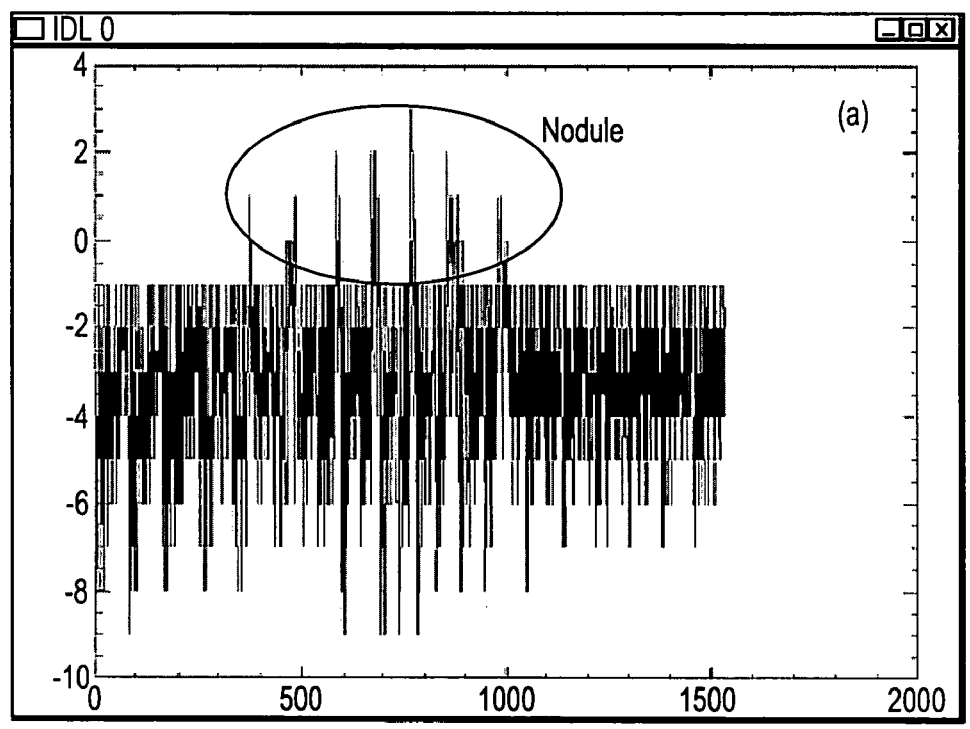
FIGS. 2(*a*)-(*c*) depict a histogram of the X, Y, and Z orientations, respectively, of every voxel of the surface, including nodule voxels, according to an embodiment of the invention.
Figure 2B:
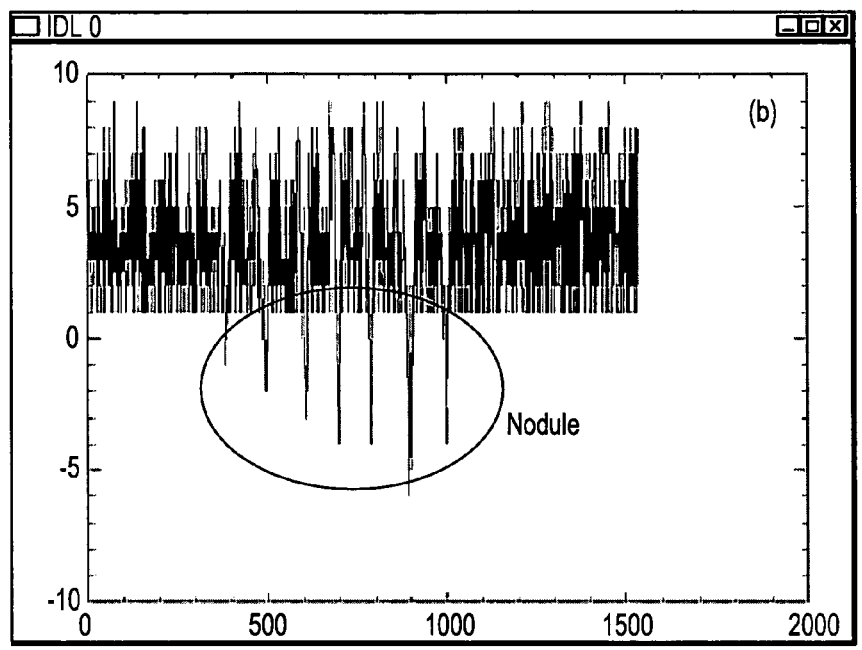
Figure 2C:
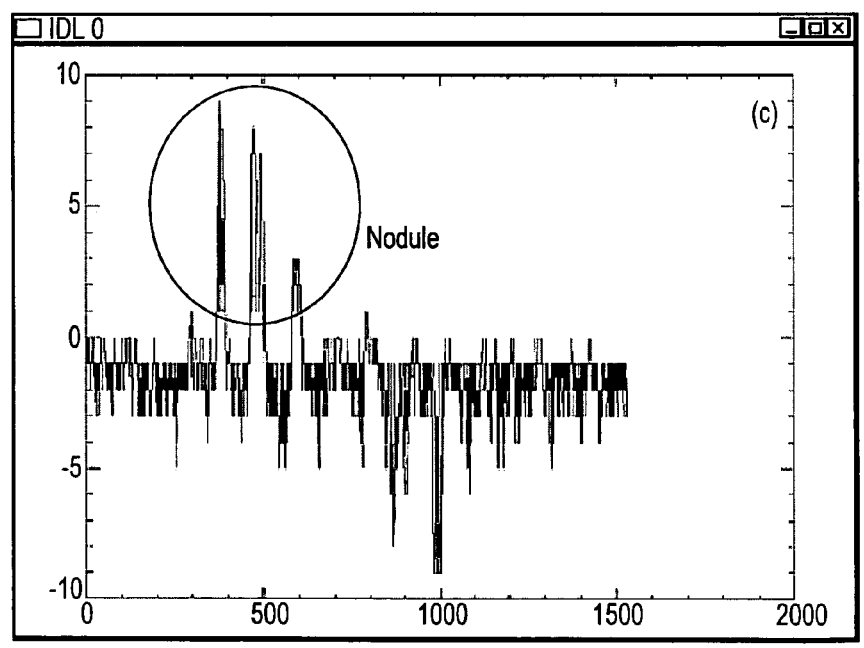

FIGS. 2(*a*)-(*c*) depict a histogram of the X, Y, and Z orientations, respectively, of every voxel of the surface, including nodule voxels, according to an embodiment of the invention. The horizontal axis of the figures corresponds to voxel indices of the voxels in the surface of interest, while the vertical axis in units of the filter sum, i.e., from −9 to 9. The circled peaks in each of the three histograms are those voxels that correspond to a nodule, which clearly have a different orientation than the rest of the surface voxels.

Figure 5:
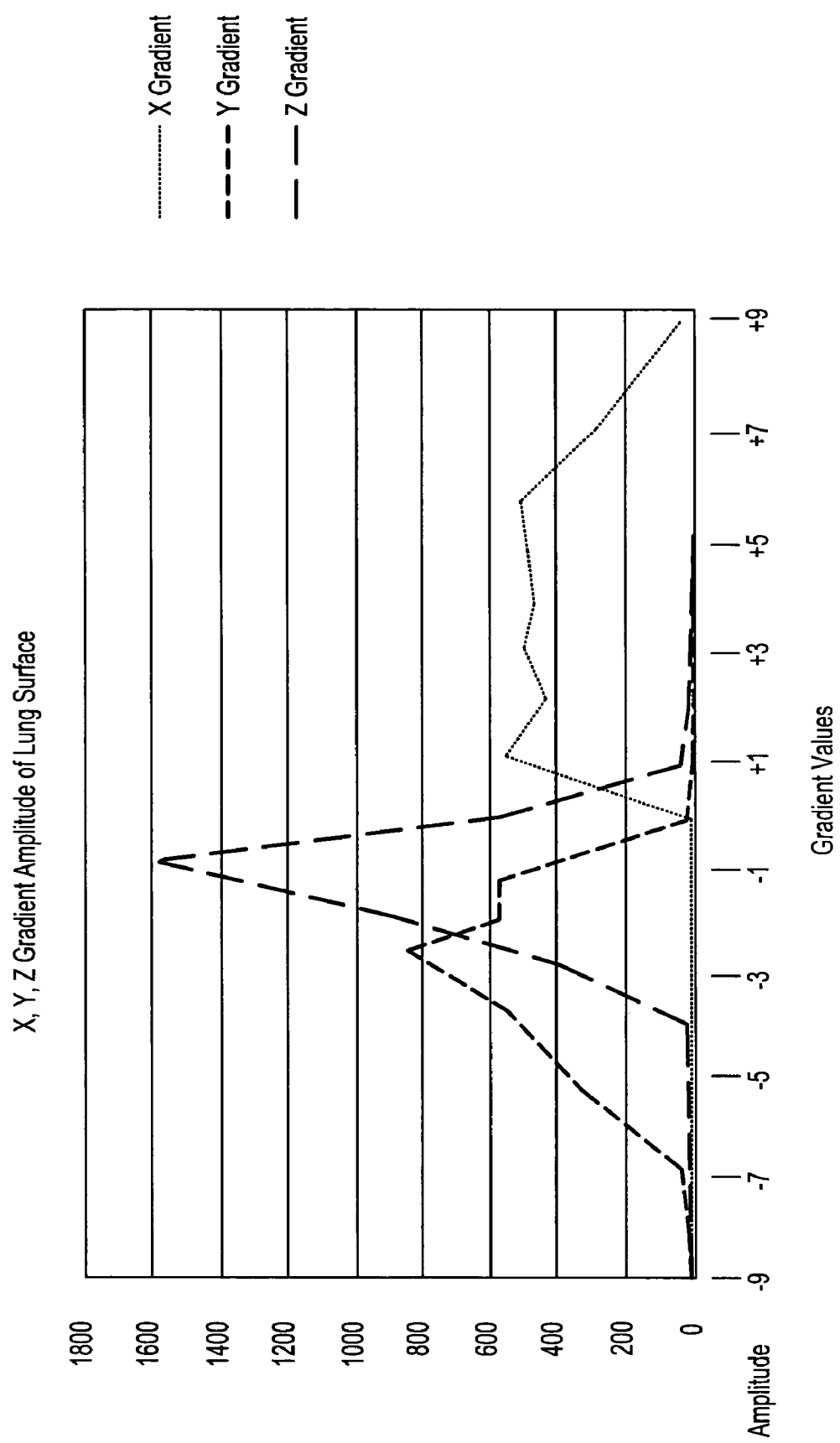
FIG. 5 depicts gradient amplitudes of lung surface points, according to an embodiment of the invention.

According to an embodiment of the invention, the Laplacian is applied to a histogram of the gradients, where gradient amplitudes are plotted as a function of the filter sum values. A graph of gradient amplitudes of lung surface points as a function of filter sum values is depicted in FIG. 5. Application of the Laplacian can determine those filter sums for which the gradient amplitude is an extremum, from which nodule points can be distinguished from the rest of the pleura. Referring to the figure, note that the X-gradient amplitude has a peak for a gradient value of approximately −1, whereas the Y-gradient amplitude has a peak for a value of about −3 and the Z-gradient amplitude has a broad plateau for values in the range 1 to 6. These gradient curves are typical for a lung nodule. Note, however, that the shape of the gradient also depends on the orientation of the nodule in the 3D space. However, since a major part of the VOI is the pleura, the shape of the gradient is similar although the nodule peak can be shifted.

A detection process according to an embodiment of the invention can serve as a first step in nodule segmentation by accurately finding a reference point for the nodule location. The reference point is defined as an average of the surface points selected by this algorithm. From this reference point, the segmentation algorithm can define a consistent region of interest that encloses the nodule and achieves a high level of consistency for nodule segmentation.

Experimental results shows that out of 20 lung nodules attached to a pleura wall, 19 nodules were segmented with less than 2% RMS deviation from the median volume. Thirteen of them had less than 0.5% RMS deviation from their median volume. One nodule reached 9% RMS deviation due to a segmentation error, as opposed to voxel selection.

Figure 3:
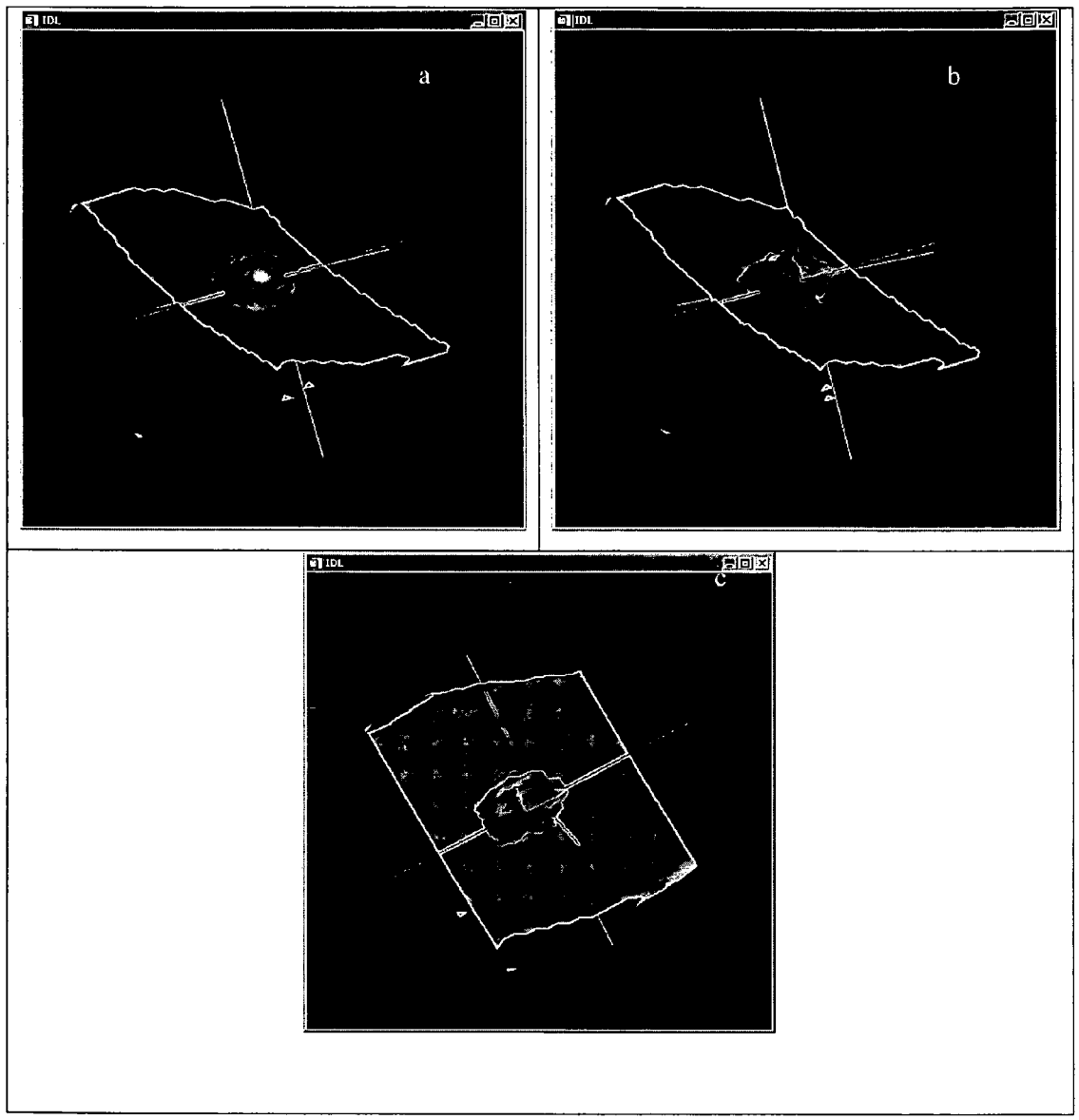
FIGS. 3(*a*)-(*c*) depict the results of nodule voxels selection, according to an embodiment of the invention.

FIGS. 3(*a*)-(*c*) depict the results of nodule voxels selection, according to an embodiment of the invention. FIG. 3(*a*) represents the original surface, while FIGS. 3(*b*) and (*c*) represent the final selection. Some points of the nodules have the orientation of the global surface and are not selected, but selected points are enough to detect the bump. Moreover, an algorithm according to an embodiment of the invention will always select the same points since it depends on an intrinsic property of the surface, specifically the orientation, which ensures a consistency in location of, for instance, the average of the selected points.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
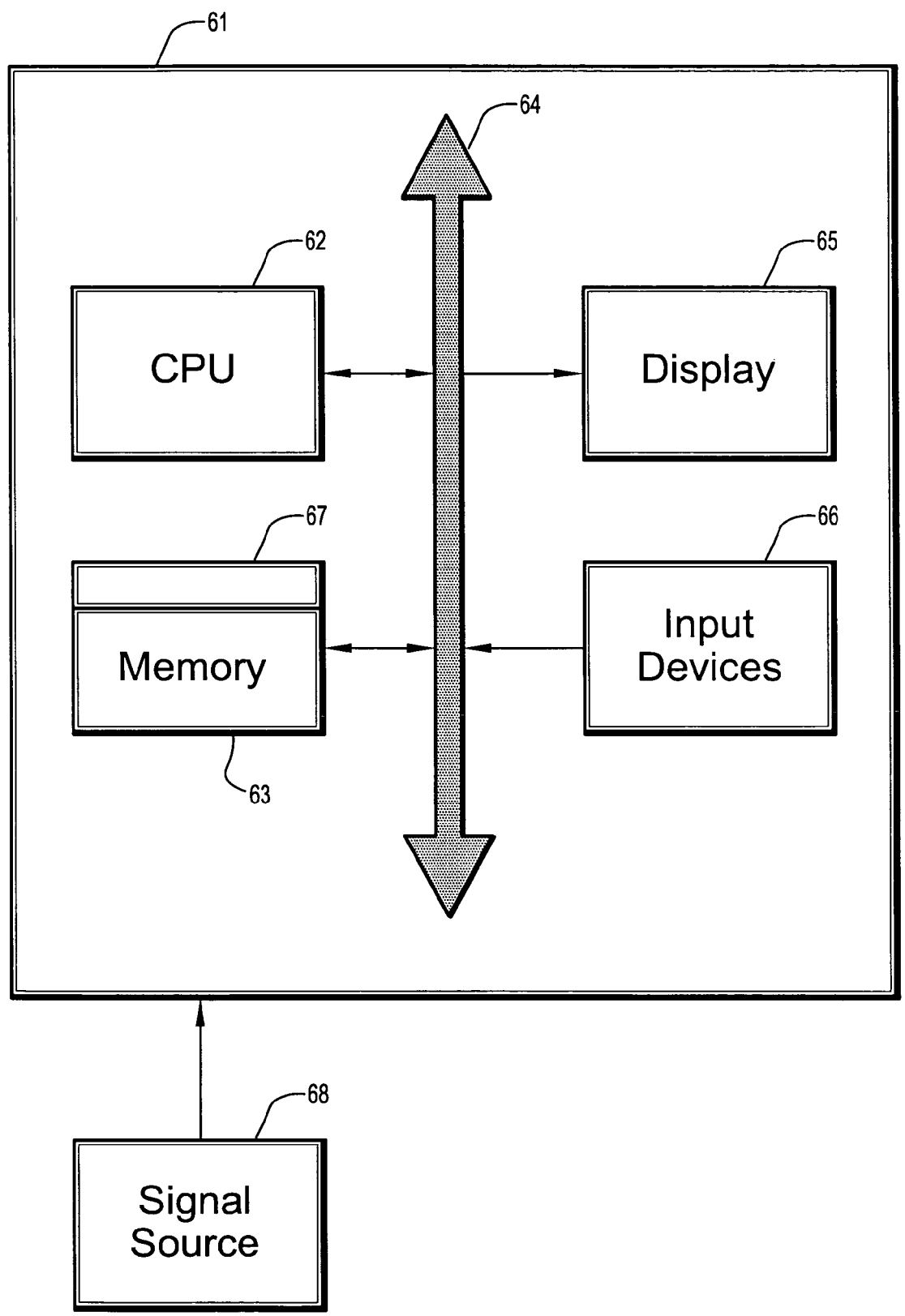
FIG. 6 is a block diagram of an exemplary computer system for implementing a 3D bump localizer according to an embodiment of the invention.

FIG. 6 is a block diagram of an exemplary computer system for implementing a 3D bump localizer according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method of detecting irregularities in a digitized image, the method performed by said computer comprising the steps of:
providing a digitized image comprising a plurality of intensities corresponding to a domain of points on a 3-dimensional grid;
selecting a sub-volume of interest in said image;
growing a surface from a point in said volume of interest;
determining the local gradient of each point on said surface, and applying a local filter to said gradient;
determining a histogram of filtered gradients, and
detecting an irregularity by selecting those points corresponding to gradient histogram values above a threshold value.

2. The method of claim 1, wherein said volume of interest is selected by a user.

3. The method of claim 1, wherein said image is subdivided into a plurality of sub-volumes, wherein each sub-volume is a volume of interest.

4. The method of claim 1 wherein said surface is grown based on an intensity constraint and a spatial constraint.

5. The method of claim 4, wherein said intensity constraint comprises a threshold wherein points on said surface are selected, and said spatial constraint comprises at least one neighbor of said surface point that is also a surface point.

6. The method of claim 1, wherein said gradient is computed over a 3×3×3 neighborhood of each surface point, and wherein said filter comprises a 3×3×3 operator defined for each of three axes, and further comprising summing each of said three filters for each surface point.

7. The method of claim 6, wherein said histogram relates each surface point to its filter sum for each of said three axes.

8. The method of claim 1, wherein said histogram threshold value is determined by applying a Laplacian operator to analyze differences in said histogram values.

9. The method of claim 6 wherein said filter comprises an X-axis operator on a plane perpendicular to a Z-axis, an Y-axis operator on a plane perpendicular to said Z-axis, and a Z-axis operator on a plane perpendicular to said Z-axis, wherein said X-axis operator takes the form

| -1 | 0 | 1 | -1 | 0 | 1 | -1 | 0 | 1 |
|----|---|---|----|---|---|----|---|---|
| -1 | 0 | 1 | -1 | 0 | 1 | -1 | 0 | 1 |
| -1 | 0 | 1 | -1 | 0 | 1 | -1 | 0 | 1 | said Y-axis operator takes the form

| 1 | 1 | 1 | 1 | 1 | 1 | 1 | 1 | 1 |
|---|---|---|---|---|---|---|---|---|
| 0 | 0 | 0 | 0 | 0 | 0 | 0 | 0 | 0 |
| -1 | -1 | -1 | -1 | -1 | -1 | -1 | -1 | -1 | and said Z-axis operator takes the form

| -1 | -1 | -1 | 0 | 0 | 0 | 1 | 1 | 1 |
|----|----|----|---|---|---|---|---|---|
| -1 | -1 | -1 | 0 | 0 | 0 | 1 | 1 | 1 |
| -1 | -1 | -1 | 0 | 0 | 0 | 1 | 1 | 1. |

10. A computer implemented method of detecting irregularities in a digitized image, the method performed by said computer comprising the steps of:
determining a gradient of each point on a surface of interest in said image, and applying a local filter to said gradient, wherein said gradient is computed over a 3×3×3 neighborhood of each surface point, and wherein said filter comprises a 3×3×3 operator defined for each of three axes, and further comprising summing each of said three filters for each surface point;
determining a histogram of filtered gradients that relates each surface point to its filter sum for each of said three axes; and
detecting an irregularity by selecting those points corresponding to gradient histogram values above a threshold value.

11. The method of claim 10, further comprising selecting a volume of interest in said image, and growing said surface from a point in said volume of interest.

12. A program storage device readable by a computer, tangibly embodying a program of instructions executable by the computer to perform the method steps for detecting irregularities in a digitized image, said method comprising the steps of:
providing a digitized image comprising a plurality of intensities corresponding to a domain of points on a 3-dimensional grid;
selecting a sub-volume of interest in said image;
growing a surface from a point in said volume of interest;
determining the local gradient of each point on said surface, and applying a local filter to said gradient;
determining a histogram of filtered gradients, and
detecting an irregularity by selecting those points corresponding to gradient histogram values above a threshold value.

13. The computer readable program storage device of claim 12, wherein said volume of interest is selected by a user.

14. The computer readable program storage device of claim 12, wherein said image is subdivided into a plurality of sub-volumes, wherein each sub-volume is a volume of interest.

15. The computer readable program storage device of claim 12, wherein said surface is grown based on an intensity constraint and a spatial constraint.

16. The computer readable program storage device of claim 15, wherein said intensity constraint comprises a threshold wherein points on said surface are selected, and said spatial constraint comprises at least one neighbor of said surface point that is also a surface point.

17. The computer readable program storage device of claim 12, wherein said gradient is computed over a 3×3×3 neighborhood of each surface point, and wherein said filter comprises a 3×3×3 operator defined for each of three axes, and further comprising summing each of said three filters for each surface point.

18. The computer readable program storage device of claim 17, wherein said histogram relates each surface point to its filter sum for each of said three axes.

19. The computer readable program storage device of claim 12, wherein said histogram threshold value is determined by applying a Laplacian operator to analyze differences in said histogram values.

20. The computer readable program storage device of claim 17, wherein said filter comprises an X-axis operator on a plane perpendicular to a Z-axis, an Y-axis operator on a plane perpendicular to said Z-axis, and a Z-axis operator on a plane perpendicular to said Z-axis, wherein said X-axis operator takes the form

| -1 | 0 | 1 | -1 | 0 | 1 | -1 | 0 | 1 |
|----|---|---|----|---|---|----|---|---|
| -1 | 0 | 1 | -1 | 0 | 1 | -1 | 0 | 1 |
| -1 | 0 | 1 | -1 | 0 | 1 | -1 | 0 | 1 | said Y-axis operator takes the form

| 1 | 1 | 1 | 1 | 1 | 1 | 1 | 1 | 1 |
|---|---|---|---|---|---|---|---|---|
| 0 | 0 | 0 | 0 | 0 | 0 | 0 | 0 | 0 |
| -1 | -1 | -1 | -1 | -1 | -1 | -1 | -1 | -1 | and said Z-axis operator takes the form

| -1 | -1 | -1 | 0 | 0 | 0 | 1 | 1 | 1 |
|----|----|----|---|---|---|---|---|---|
| -1 | -1 | -1 | 0 | 0 | 0 | 1 | 1 | 1 |
| -1 | -1 | -1 | 0 | 0 | 0 | 1 | 1 | 1. |

\* \* \* \* \*